(No Model.)
T. TUCKER.
COMPENSATING GEAR.
No. 382,337. Patented May 8, 1888.
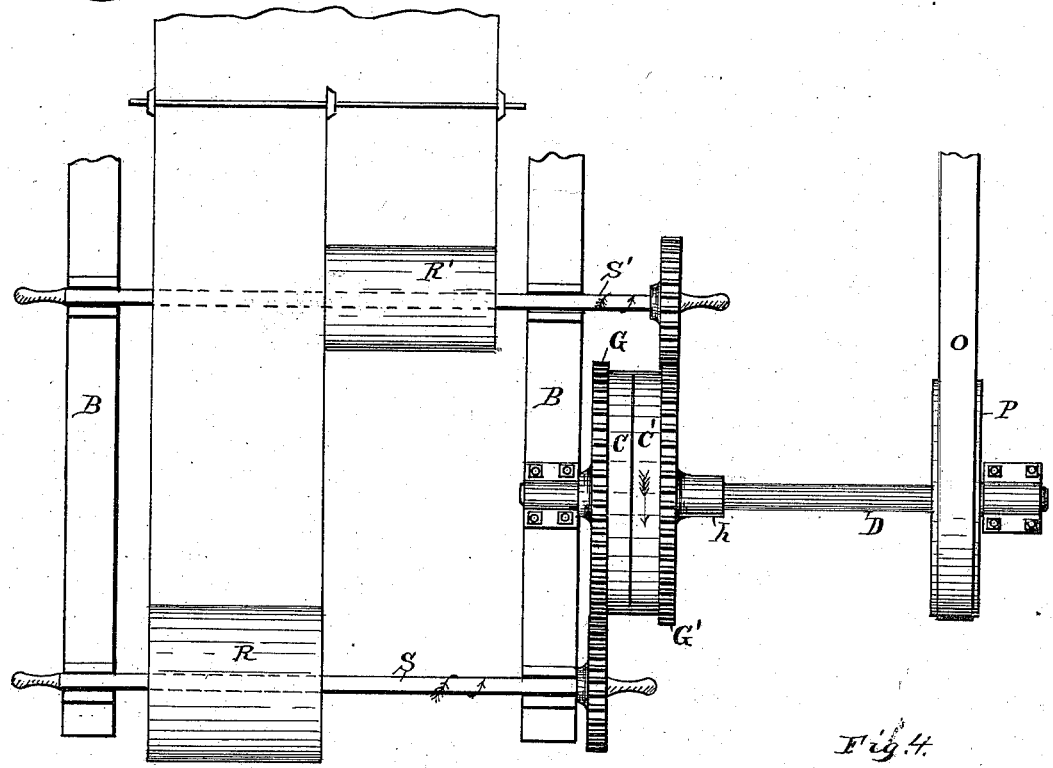
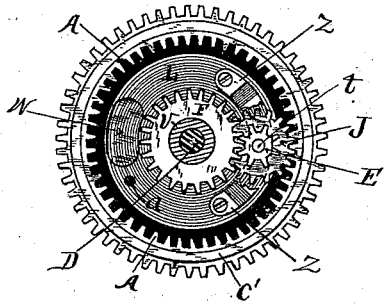
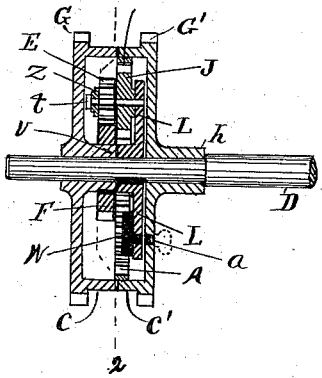
Witnesses.
Thos. H. Hutchins.
Wm. J. Hutchins.
Inventor.
Thomas Tucker.

UNITED STATES PATENT OFFICE.

THOMAS TUCKER, OF MARSEILLES, ILLINOIS.

COMPENSATING GEAR.

SPECIFICATION forming part of Letters Patent No. 382,337, dated May 8, 1888.

Application filed January 16, 1888. Serial No. 260,851. (No model.)

*To all whom it may concern:*

Be it known that I, THOMAS TUCKER, a citizen of Great Britain, residing at Marseilles, in the county of La Salle and State of Illinois, have invented certain new and useful Improvements in Compensating Gears, of which the following is a specification, reference being had therein to the accompanying drawings.

This invention relates to certain improvements in "compensating gears," the construction and operation of which are fully set forth and explained in the following specification and claims, reference being had to the accompanying drawings, and the letters and figures of reference thereon, making a part of this specification, in which—

Figure 1 is a plan view of the compensating gear, shown as applied to the use of winding rolls of paper-web. Fig. 2 is a view taken on line 2 of Fig. 3, showing a plan of the interior gear mechanism for connecting the two compensating gears. Fig. 3 is a central longitudinal sectional view of the compensating gears, showing a side view of the shaft and a face view of the smaller idler-pinion; and Fig. 4 is a view of a thumb-screw for connecting and locking one of the gear-wheels with the disk secured on the shaft.

Referring to the drawings, G and G' are a pair of spur-gears of equal diameter sleeved on the shaft D, and provided with facing side flanges, C C', arranged to nearly meet and form a case for containing the gear mechanism for connecting said pinions. The gear G has an inwardly-extending hub, V, upon which is fixed the spur-gear F. The gear G' has an outwardly-extending hub, h, for giving it a steady bearing on shaft D, and is provided with the internal gear, A, within its flange C'. L is a disk secured on shaft D between the two gears G G' within the case formed by their flanges, and E and J are a pair of idler-pinions connected or integral and studded to the side of disk L near its periphery, and Z is a bracket secured to the side of said disk for supporting the outer end of stud t of idler-pinions E J. Said disk is weighted at W on its opposite side from said pinions E J to counterbalance their weight.

The two gears G G' are connected through the medium of the idler-pinions E J, the internal gear, A, meshing with idler-pinion J and idler-pinion E meshing into gear F on hub V of gear G.

The idler-pinion E and gear F, with which it meshes, bear the same relative diameter with each other as do the idler-pinions J with internal gear, A, with which it meshes, illustrated in the drawings as each geared three to one.

Power applied to shaft D will drive the gears G G', through the medium of the disk L and idler-pinions connecting them therewith, as shown, and when said gears are required to simultaneously drive each a separate object at a different or variable speed one of said gears is permitted to rotate faster than the other and permit such variable speed. This is accomplished by reason of their being connected through the medium of said idler-pinions which drive them, but permit them to rotate at different speeds. Simply to show the application of its use in Fig. 1, the device is shown as applied to the winding of paper-web as it comes from the rolls of a paper-making machine.

The paper-rolls R R' are shown as being of different diameters. The shafts S S', upon which they are respectively wound, are provided with pinions respectively meshing with the gears G G', which drive them.

As the rolls R R' are of different diameters, one must rotate at greater speed than the other, and yet have only the same tension on the paper as the other, and, also, the speed of the rolls must be variable, as the rolls may possibly unequally increase in diameter. This is all accomplished by means of connecting the gears G G', as shown and described.

When desired, the gear-wheel G' may be locked with said disk by means of the thumb-screw a', screwed in corresponding screw-threaded holes a in each, as shown in Fig. 3, which will cause the gears G G' to both rotate at the same speed as one gear.

Having thus described my invention, what I claim as new, and desire to secure by Letters Patent, is as follows, to wit:

1. The combination of shaft D, weighted disk L, secured thereon, pinions E J, of different diameters, studded to the side of said disk on the opposite side from its weight, gear G, sleeved loosely on said shaft and having the gear F secured on its inwardly-extending hub V, and gear G', having the internal gear, A, substantially as and for the purpose set forth.

2. The combination of gear-wheel G, having the gear-wheel F and flange C, gear-wheel G', having the flange C', and internal gear, A, shaft D, having said gears G G' sleeved loosely thereon, disk L, secured on said shaft between said gears G G', and the idler pinions E J, studded to the side of said disk and connecting said gears G G', substantially as and for the purpose set forth.

3. In the compensating gear shown and described, the combination of gear-wheel G, having the gear F on its interior hub, the gear G', having the internal gear A, and idler-pinions E J, connecting said gears G G', the gear F and idler-pinion E, with which it meshes, being relatively of the same proportional diameter as the idler-pinion J and internal gear, A, with which it meshes, substantially as and for the purpose set forth.

4. In a compensating gear, in combination, with a shaft, a pair of equal spur-gears loosely sleeved thereon, a spur-gear of less diameter on one of said equal gears, an internal gear within the rim or flange of its fellow equal gear, a disk secured on said shaft between said equal gears, and a pair of connected idler-pinions studded to said disk and arranged to connect the interior gears of said equal gears in the manner substantially as and for the purpose specified.

THOMAS TUCKER.

Witnesses:
F. T. NEFF,
F. E. PORTER.